United States Patent
Kim et al.

(10) Patent No.: US 9,919,675 B2
(45) Date of Patent: Mar. 20, 2018

(54) SIDE CURTAIN AIRBAG FOR VEHICLE (71) Applicant: Autoliv Development AB, Vårgårda (SE)

(72) Inventors: Chi Ho Kim, Hwaseong-si (KR); Soon-Bok Lee, Hwaseong-si (KR); Dion Kruse, Alingsås (SE); Tae Ik Gwon, Hwaseong-si (KR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 15/117,797

(22) PCT Filed: Jan. 13, 2015

(86) PCT No.: PCT/KR2015/000331
§ 371 (c)(1),
(2) Date: Aug. 10, 2016

(87) PCT Pub. No.: WO2015/122623
PCT Pub. Date: Aug. 20, 2015

(65) Prior Publication Data
US 2017/0008478 A1 Jan. 12, 2017

(30) Foreign Application Priority Data

Feb. 12, 2014 (KR) .................. 10-2014-0015867

(51) Int. Cl.
*B60R 21/232* (2011.01)
*B60R 21/237* (2006.01)
(Continued)

(52) U.S. Cl.
CPC .......... *B60R 21/232* (2013.01); *B60R 21/237* (2013.01); *B60R 21/2338* (2013.01);
(Continued)

(58) Field of Classification Search
CPC . B60R 21/232; B60R 21/2338; B60R 21/237; B60R 2021/23386; B60R 2021/161; B60R 2021/0048
See application file for complete search history.

(56) References Cited

U.S. PATENT DOCUMENTS 7,296,822 B2 * 11/2007 Bakhsh ................. B60R 21/213
280/730.1
7,938,440 B2   5/2011 Kataoka et al.
(Continued)

FOREIGN PATENT DOCUMENTS

JP   2010-132219 A   6/2010
KR   2011-0066125 A  6/2011

OTHER PUBLICATIONS

International Search Report and Written Opinion of the ISA, ISA/KR, Daejeon, dated Apr. 30, 2015.

*Primary Examiner* — Darlene P Condra
(74) *Attorney, Agent, or Firm* — Stephen T. Olson; Harness, Dickey & Pierce, P.L.C.

(57) ABSTRACT

A side curtain airbag for a vehicle includes an inner panel facing an interior of the vehicle, an outer panel facing the inner panel, a stopper chamber configured to prevent a head of an occupant seated on the vehicle from being moved toward a front side of the vehicle, a forward chamber arranged at a front side of the stopper chamber, and a rearward chamber arranged at a rear side of the stopper chamber. The forward chamber and the rearward chamber are arranged to be adjacent to each other such that in a non-inflation state of the airbag, a portion in which the stopper chamber is located is folded at least one time to form an overlapped portion.

16 Claims, 9 Drawing Sheets (51) Int. Cl.
  *B60R 21/2338* (2011.01)
  *B60R 21/00* (2006.01)
  *B60R 21/16* (2006.01)

(52) U.S. Cl.
  CPC . *B60R 2021/0048* (2013.01); *B60R 2021/161* (2013.01); *B60R 2021/23386* (2013.01)

(56) References Cited

U.S. PATENT DOCUMENTS

| | | |
|---|---|---|
| 7,967,334 B2 | 6/2011 | Breuninger et al. |
| 2003/0015862 A1* | 1/2003 | Jost ................ B60R 21/201 280/730.2 |
| 2003/0178831 A1* | 9/2003 | Roberts ........... B60R 21/23138 280/743.1 |
| 2009/0160166 A1 | 6/2009 | Kataoka et al. |
| 2010/0253055 A1* | 10/2010 | Schneider ........ B60R 21/2171 280/742 |
| 2010/0276915 A1 | 11/2010 | Breuninger et al. |
| 2011/0260436 A1* | 10/2011 | Park ................. B60R 21/2342 280/735 |
| 2012/0001407 A1 | 1/2012 | Cheal et al. |
| 2012/0193898 A1* | 8/2012 | Kalandek .......... B60R 21/232 280/730.2 |
| 2012/0286500 A1* | 11/2012 | Wiik ................. B60R 21/213 280/730.2 |
| 2012/0307057 A1* | 12/2012 | Berkhahn .......... B64D 45/0015 348/144 |
| 2014/0035265 A1 | 2/2014 | Nakashima et al. |
| 2014/0203541 A1* | 7/2014 | Wei .................. B60R 21/213 280/730.2 |
| 2015/0307057 A1* | 10/2015 | Moon ............... B60R 21/232 280/728.2 |
| 2016/0107599 A1* | 4/2016 | Lee .................. B60R 21/237 280/730.2 |
| 2016/0107602 A1* | 4/2016 | Nakashima ........ B60R 21/233 280/728.2 |
| 2016/0129875 A1* | 5/2016 | Massa ............... B60R 21/213 280/730.2 |
| 2016/0229370 A1* | 8/2016 | Hampson .......... B60R 21/232 |
| 2016/0297394 A1* | 10/2016 | Fujiwara .......... B60R 21/237 |
| 2017/0166158 A1* | 6/2017 | Oh ................... B60R 21/232 |

* cited by examiner

SIDE CURTAIN AIRBAG FOR VEHICLE

CROSS-REFERENCE TO RELATED APPLICATIONS

This application is a 371 U.S. National Stage of International Application No. PCT/KR2015/000331, filed Jan. 13, 2015, which claims the benefit of and priority to Korean Patent Application No. 10-2014-0015867, filed Feb. 12, 2014. The entire disclosures of the above applications are incorporated herein by reference.

TECHNICAL FIELD

The present invention relates to an airbag for protecting a head of an occupant, more particularly, to a side curtain airbag for a vehicle, which is configured to be deployed along an inner surface of a vehicle door upon vehicle impact, such as vehicle lateral impact or rollover.

BACKGROUND ART

A side curtain airbag for a vehicle is transversely installed at an interior upper end of the vehicle to be deployed upon vehicle impact. The side curtain airbag displays effect upon a rollover event as well as vehicle lateral impact, so that high safety is provided to an occupant.

When an inflator is operated according to an impact signal, gas generated from the inflator is introduced into the curtain airbag to inflate the curtain airbag, and the inflating curtain air bag is deployed in the interior of the vehicle to protect the occupant from the vehicle impact.

In general, the inflator is disposed at an upper rear portion or upper central portion of the curtain airbag such that the gas generated from the inflator is introduced into inflatable chambers of the curtain airbag, thereby inflating the inflatable chambers.

Upon vehicle lateral impact or rollover event, there is a problem that the occupant is ejected toward a front side of the vehicle, and a head of the occupant slides along an instrument panel.

Patent Document: U.S. Pat. No. 7,967,334

DISCLOSURE OF INVENTION

Technical Problem

An object of the present invention is to provide a side curtain airbag for a vehicle, which early prevents a head of an occupant from being ejected toward a front side of the vehicle upon vehicle impact.

Another object of the present invention is to provide a side curtain airbag for a vehicle, which improves a stopping force for preventing a head of an occupant from being ejected toward a front side of the vehicle upon vehicle impact.

Still another object of the present invention is to provide a side curtain airbag for a vehicle, which reduces the number of processes of manufacturing the side curtain airbag while having a structure reinforcing a force for stopping the head of occupant.

Solution to Problem

According to an exemplary embodiment of the present invention, a side curtain airbag for a vehicle (hereinafter referred to as "airbag") is provided. The airbag includes an inner panel facing an interior of the vehicle, an outer panel facing the inner panel, a stopper chamber configured to prevent a head of an occupant seated in the vehicle from being moved toward a front side of the vehicle, a forward chamber arranged at a front side of the stopper chamber, and a rearward chamber arranged at a rear side of the stopper chamber, wherein the forward chamber and the rearward chamber may be arranged to be adjacent to each other such that in a non-inflation state of the airbag, a portion in which the stopper chamber is located may be folded at least once to form an overlapped portion.

The stopper chamber may be provided in at least one space of a front seat space and a rear seat space of the vehicle.

The airbag may further include a front end side chamber defined by a front end side chamber wall to correspond to the front side of the vehicle, a front chamber defined by a front chamber wall to be adjacent to the front end side chamber, and a front stopper chamber interposed between the front end side chamber and the front chamber to prevent the head of the occupant from being moved toward the front side of the vehicle.

The front end side chamber wall may be arranged to be adjacent to the front chamber wall such that in the non-inflation state of the airbag, the front stopper chamber protrudes toward the interior of the vehicle and includes the overlapped portion folded at least once. Upper ends and lower ends of the overlapped portion of the front stopper chamber may be sewed to each other respectively through a sewing line.

The front end side chamber wall and the front chamber wall may be coupled to each other by a sewing line or a tether member.

The overlapped portion may be located on the inner panel toward a rear side of the vehicle.

The airbag may further include a front strap having one end coupled to a front vehicle body of the vehicle and the other end coupled to the front end side chamber wall and the front chamber wall adjacent to each other.

The airbag may further include a strength reinforcement member coupled to an outer side of the stopper chamber to reinforce a supporting strength of the stopper chamber.

The strength reinforcement member may include a tether member having one end coupled to the outer side of the stopper chamber, the outer side facing the interior of the vehicle, and the other end fixedly coupled to at a predetermined location such that the stopper chamber is pulled toward a rear side of the vehicle.

The airbag may be configured to prevent the stopper chamber from being moved toward the front side of the vehicle by increasing an inflation volume of the forward chamber arranged at the front side of the stopper chamber.

Advantageous Effects of Invention

According to one exemplary embodiment of the present invention, upon vehicle impact, the stopper chamber early prevents the head of the occupant from being ejected toward the front side of the vehicle, thereby preventing the head of the occupant from colliding with an instrument panel of the vehicle and being injured.

According to another exemplary embodiment of the present invention, the stopper chamber is configured to have an overlapped portion in a non-inflation state of the airbag, and an outer side of the stopper chamber is fixed through the sewing line or tether member toward the rear side of the vehicle. Accordingly, a deployment characteristic of the stopper chamber to be inflated toward the interior of the vehicle is improved, thereby enhancing a function for stopping the head.

According to another exemplary embodiment of the present invention, the overlapped portion of the stopper chamber is located on the inner panel of the airbag toward the rear side of the airbag, thereby improving the stopping function of the stopper chamber.

According to still another exemplary embodiment of the present invention, the one end of the strap giving a tensile force of a transverse direction to the airbag is coupled to the front side vehicle body, and the other end of the strap is coupled to the outer side of the overlapped portion of the stopper chamber, thereby reducing the sewing portions and increasing the productivity of the airbag.

MODE FOR THE INVENTION

Hereinafter, exemplary embodiments of the present invention will be described in detail with reference to accompanying drawings. However, the present invention is not limited to the following embodiments, but various modifications may be realized. The present embodiments are provided to make the disclosure of the present invention perfect and to make those skilled in the art perfectly comprehend the scope of the present invention.

In the below descriptions, a transverse direction refers to a forward-rearward direction of the vehicle, along which the airbag according to an exemplary embodiment of the present invention is installed in a folded state, and a vertical direction refers to a upward-downward direction along which the airbag according to an exemplary embodiment of the present invention is deployed in the vehicle.

Hereinafter, side curtain airbags for a vehicle according to various exemplary embodiments of the present invention will be described. The side curtain airbags are substantially installed at a lateral portion of a roof panel in a folded state to extend from a front pillar of the vehicle to a rear pillar such that upon lateral impact or rollover event, the airbags inflate and deploy in a curtain shape along an inner side of the vehicle.

Figure 1:
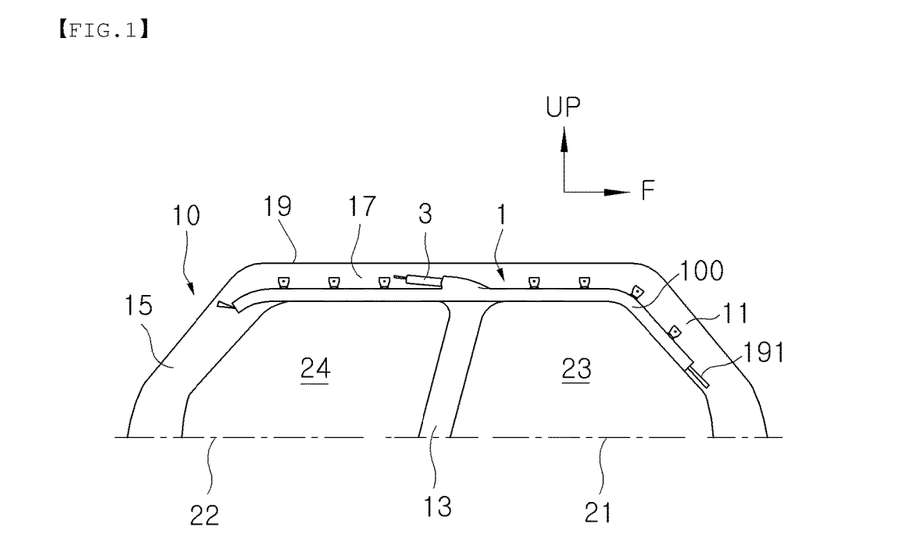
FIG. 1 is a side view showing a configuration of a side curtain airbag for a vehicle according to an exemplary embodiment of the present invention.

FIG. 1 is a side view showing a configuration of a side curtain airbag for a vehicle according to an exemplary embodiment of the present invention.

Referring to FIG. 1, a side curtain airbag apparatus 1 is installed in a folded state at a roof side rail 3 located at an upper periphery of a window of a vehicle body 10 in the transverse direction.

The vehicle body 10 includes a front pillar 11, a center pillar 13, a rear pillar 15, and a roof side rail 17 coupled to upper ends of the respective pillars 11, 13, and 15. The roof side rail 17 extends in the forward and rearward directions of the vehicle 10 to support a roof 19. The roof side rail 17 is installed along the edge of the roof 19.

The vehicle body 10 includes a front side door 21 installed between the front pillar 11 and the center pillar 13 and a rear side door 22 installed between the center pillar 13 and the rear pillar 17. A front window 23 is arranged at an upper portion of the front side door 21, and a rear window 24 is arranged at an upper portion of the rear side door 22.

The side curtain airbag apparatus 1 is installed in the roof side rail 17. The side curtain airbag apparatus 1 includes a side curtain airbag 100 mounted to the roof side rail 17 in a folded state along upper edges of the front and rear side doors 21 and 22 and an inflator 3 for generating gas upon vehicle impact.

A central portion of the airbag 100, which is located between a front side seat and a rear side seat, is coupled to the inflator 3.

When the impact of more than a predetermined level is applied to the lateral part of the vehicle 10, the gas is generated from the inflator 3, and the gas generated from the inflator 3 is supplied into the airbag 100. The airbag 100 is downwardly deployed along the windows 23 and 24.

Figure 2:
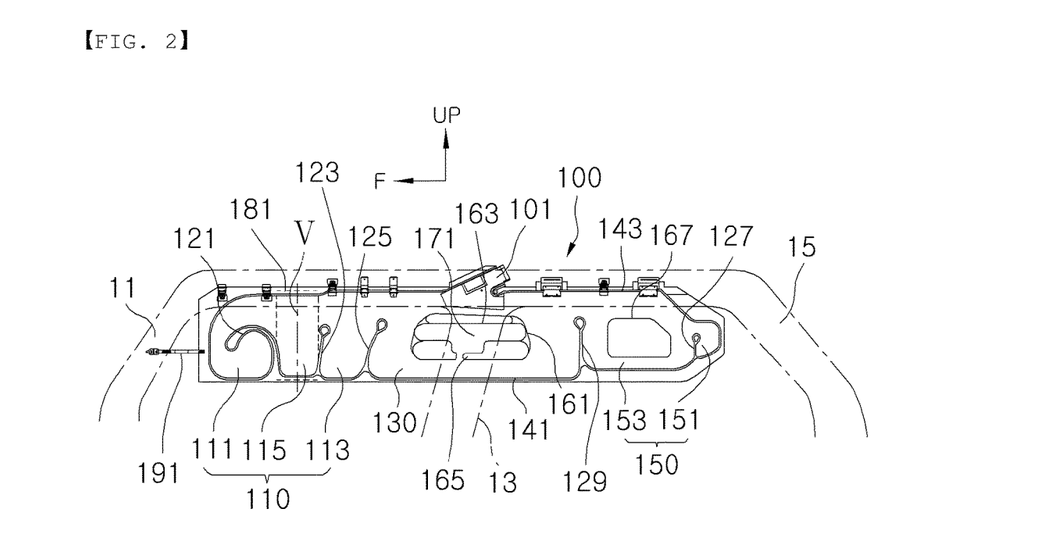
FIG. 2 is a side view showing a state in which a side curtain airbag for a vehicle according to an exemplary embodiment of the present invention is fully unfolded in a non-inflation state
Figure 3:
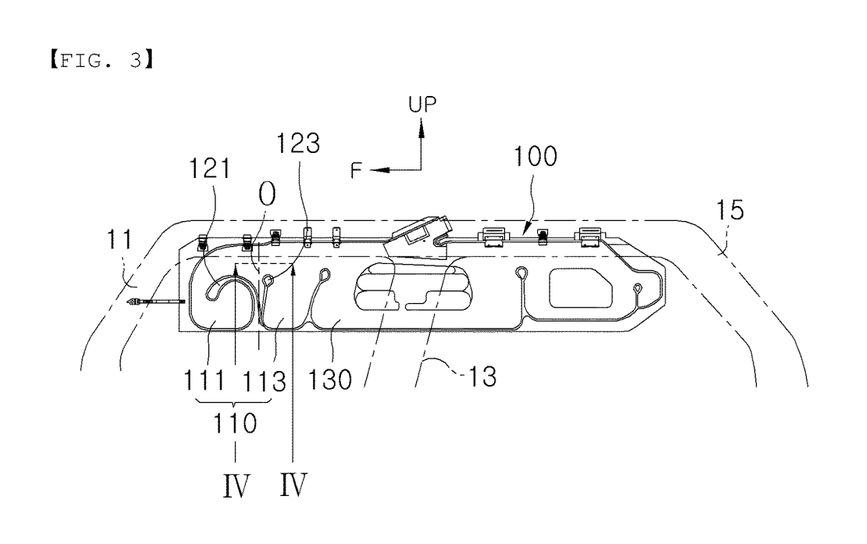
FIG. 3 is a side view showing a state in which upper ends and lower ends of the stopper chamber of FIG. 2 are sewed, respectively.

FIG. 2 is a side view showing a state in which a side curtain airbag for a vehicle according to an exemplary embodiment of the present invention is fully unfolded in a non-inflation state, and FIG. 3 is a side view showing a state in which upper ends and lower ends of the stopper chamber of FIG. 2 are sewed, respectively.

Referring to FIGS. 2 and 3, the airbag 100 includes two panels disposed to face each other and a plurality of chambers defined by a plurality of chamber walls. The chambers are comprised of a front seat side chamber part 110 corresponding to a front seat space of the vehicle, a rear seat side chamber part 150 corresponding to the rear seat space, and a middle chamber 130 corresponding to the center pillar 13 of the vehicle.

The front seat side chamber part 110 includes a front end side chamber 111 approximately adjacent to the front pillar 11 of the vehicle, a front chamber 113 adjacent to a front side of the middle chamber 130, and a front stopper chamber 115 disposed between the front end side chamber 111 and the front chamber 113. The front end side chamber 111, the front stopper chamber 115, the front chamber 113, and the middle chamber 130 are defined by a front end side chamber wall 121, a front chamber wall 123, and a front side middle chamber wall 125.

The rear seat side chamber part 150 includes a rear end side chamber 151 adjacent to the rear pillar 15 of the vehicle and a rear chamber 153 disposed between the middle chamber 130 and the rear end side chamber 151. The rear chamber 153 and the rear end side chamber 151 are defined by a rear end side chamber wall 127 and the rear side middle chamber wall 129.

The respective chamber walls 121, 123, 125, 127, and 129 may be formed by overlapping two panels having airtightness and flexibility, and then sewing or bonding the two panels. Alternatively, the respective chamber walls 121, 123, 125, 127, and 129 may be formed by a one-piece-woven manner during formation of a one piece woven airbag.

The respective chamber walls 121, 123, 125, 127, and 129 protrude upwardly from a lower end wall 141 of the airbag 100 by a predetermined distance.

Upper ends of the respective chamber walls 121, 123, 125, 127, and 129 are spaced apart from the upper end wall 143 of the airbag 100 by a predetermined distance to open the upper portions of the respective chambers 111, 113, 115, 130, 151, and 153.

The upper end of the front end side chamber wall 121 is configured to extend by a predetermined distance toward the front end of the airbag 100 in the transverse direction.

A chamber wall 161 approximately having a rectangular shape is formed between the front side middle chamber wall 125 and the rear side middle chamber wall 129 while being spaced apart from a lower end chamber wall 141 by a predetermined distance. A T-shaped chamber 171 is defined in the rectangular chamber wall 161 by a T-shaped chamber wall 163. The T-shaped chamber 171 fluidly communicates with the middle chamber 130 by a connection chamber wall 165 connected to lower ends of the T-shaped chamber wall 163 and the rectangular chamber wall 161.

The middle chamber 130 has a U shape by the chamber wall 161 approximately having the rectangular shape.

A closed wall 167 is formed in the rear chamber 153 while being spaced from the lower end wall 141 by a predetermined distance, so that the rear chamber 153 approximately has a U shape.

The airbag 100 has an overlapped portion O (see FIG. 3) which is formed by folding a portion in which the stopper chamber 115 is located along a vertical central line V such that the stopper chamber 115 relatively protrudes toward the interior part of the vehicle (see FIG. 2). The upper ends of the overlapped portion are coupled to each other through the sewing line 181, and the lower ends of the overlapped portion are coupled to each other through the sewing line 181. The sewing lines 181 are arranged outer side the upper end wall 143 and the lower end wall 141.

The front end side chamber wall 111 and the front chamber wall 123 are arranged to be adjacent to each other through the overlapped portion O. Through this configuration, when the airbag 100 is inflated, the front stopper chamber 115 forcedly faces the interior the vehicle and protrudes toward the occupant compartment (see FIG. 3).

FIG. 3 shows a state in which the overlapped portion is formed by once folding the portion in which the front stopper chamber 115 is located along the vertical central line V. However, the overlapped portion O may be configured by folding the portion in which the front stopper chamber 115 is located at least once. The number of folded portions may be increased to enlarge the inflation volume of the front stopper chamber 115.

One end of a front strap 191 is coupled to the middle portion of a front end of the airbag 100, and the other end of the front strap 191 is coupled to a front vehicle body such as the front pillar 11. The front strap 191 gives a transverse tensile force to the airbag 100, so that when the airbag 100 is inflated, the airbag 100 is prevented from being inflated toward the rear side of the vehicle.

A connection portion 101 is formed at an upper middle portion of the airbag 100 such that the inflator 3 (see FIG. 1) is coupled to the connection portion 101. The connection portion 101 is substantially formed in a Y shape to guide the gas generated from the inflator 3 toward the front and rear sides of the vehicle.

Figure 4A:
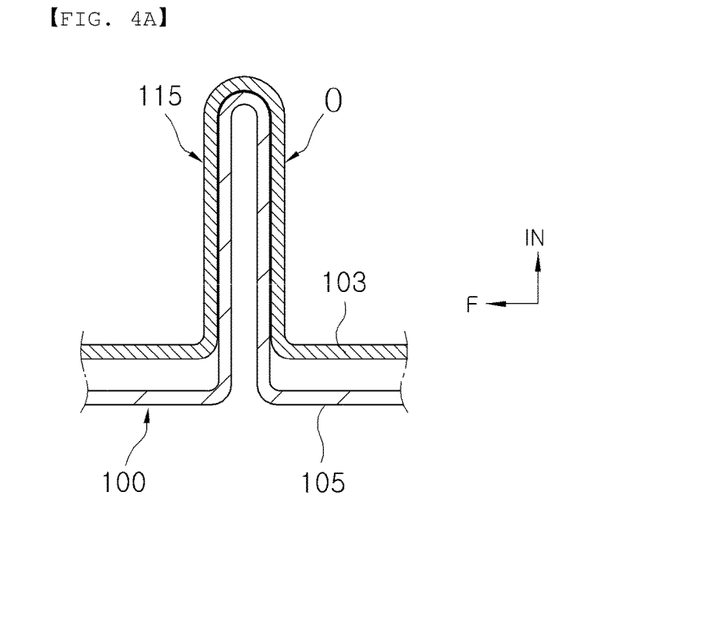
FIG. 4a is a cross-sectional view taken along a line IV-IV.

FIG. 4a is a cross-sectional view taken along a line IV-IV.

Referring to FIGS. 3 and 4a, the airbag 100 includes an inner panel 103 facing the interior of the vehicle and the outer panel 105 facing the inner panel 103. The portion of the airbag 100, in which the stopper chamber 115 is located, is folded to protrude toward the interior of the vehicle so as to form the overlapped portion O.

Since the stopper chamber 115 is configured to have an overlapped shape toward the interior of the vehicle. Accordingly, when the airbag is deployed, the stopper chamber is deployed to further protrude toward the interior of the vehicle. As a result, the head of the occupant is stopped early, thereby preventing the head of the occupant from sliding along an instrument panel of the vehicle and enhancing the occupant protection effect.

In other words, since the stopper chamber 115 is configured to have the overlapped portion, the front end side chamber 111 and the front chamber 113 are disposed to be adjacent to each other, so that upon vehicle lateral impact, the stopper chamber 115 is forced to protrude further than perimeter chambers toward the interior of the vehicle. As a result, upon lateral impact, the stopper chamber 115 is positioned to be further adjacent to the head of the occupant. Accordingly, the stopper chamber 115 early makes contact with the occupant, thereby early preventing the head of the occupant from being ejected toward the front side of the vehicle.

Figure 4B:
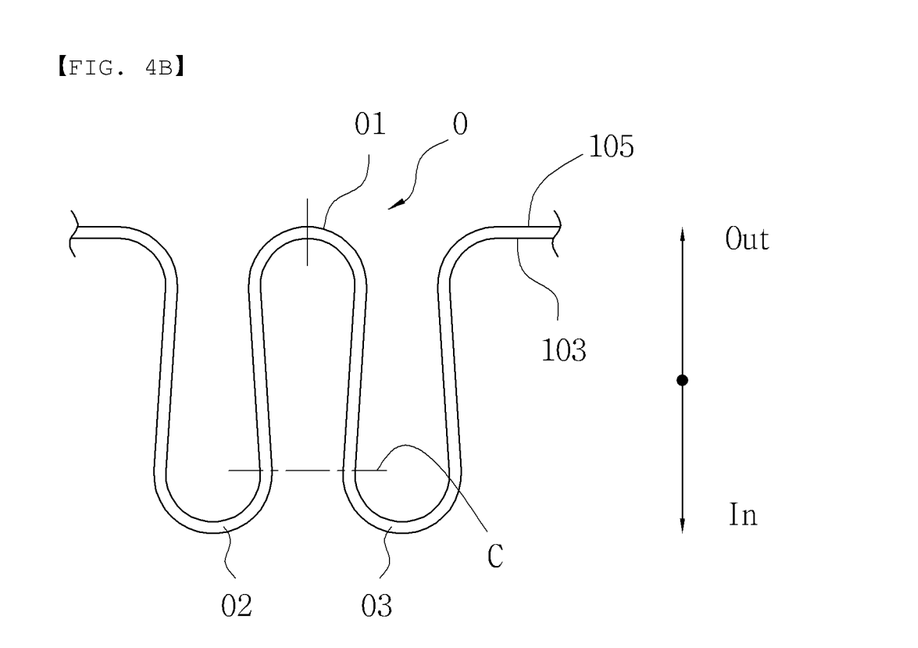
FIG. 4b is a cross-sectional view showing a configuration of a stopper chamber of a side curtain airbag for a vehicle according to another exemplary embodiment of the present invention.

FIG. 4b is a cross-sectional view showing a configuration of a stopper chamber of a side curtain airbag for a vehicle according to another exemplary embodiment of the present invention.

In the above descriptions, the overlapped portion O which protrudes toward the occupant compartment of the vehicle is described. However, the protruding direction is not limited thereto, but the protruding direction of the overlapped portion O may be modified variously.

Referring to 4b, the overlapped portion O of the stopper chamber 115 includes a central folded portion O1 formed by folding a central portion of the stopper chamber 115 toward the outer panel 105 of the airbag 100 and lateral folded portions O2 and O3 formed by folding the both sides of the central folded portion O1 toward the inner panel 103.

The lateral folded portions O2 and O3 are coupled to each other through a rupturable connection member such as sewing line or tether.

Figure 4C:
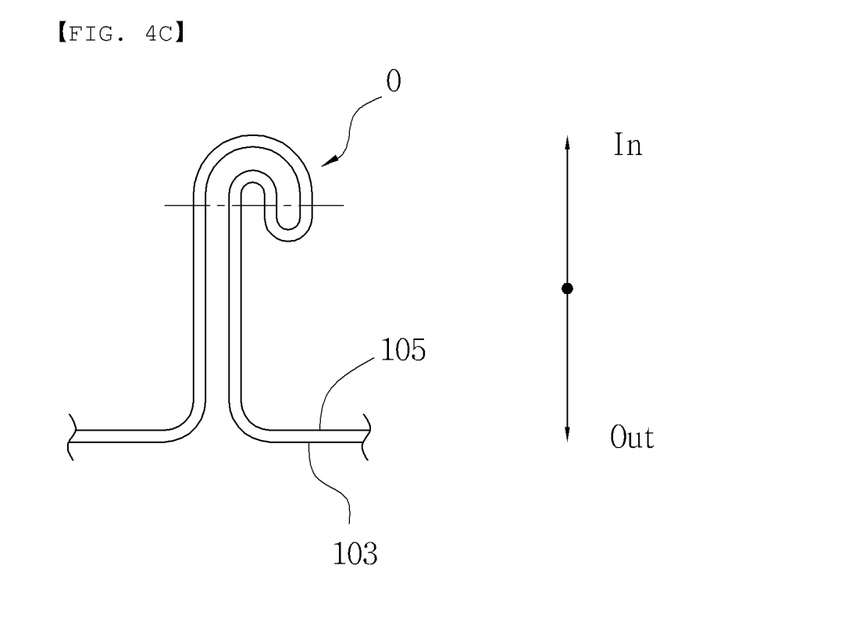
FIG. 4c is a cross-sectional view showing a configuration of a stopper chamber of a side curtain airbag for a vehicle according to still another exemplary embodiment of the present invention.

FIG. 4c is a cross-sectional view showing a configuration of a stopper chamber of a side curtain airbag for a vehicle according to still another exemplary embodiment of the present invention.

Referring to FIG. 4c, the overlapped portion O is formed by folding a central portion M to protrude from the inner surface of the inner panel 103, and then folding the overlapped portion again toward the outer panel 105.

The folding direction and the number of folded portions of the above overlapped portion O may be modified variously. Through control of the number of folded portions, the inflated depth of stopper chamber 115 can be controlled.

As described above, since the stopper chamber 115 is configured to include the overlapped portion O, the transverse length of the airbag 100 is not substantially increased due to the stopper chamber 115. As a result, the stopper chamber 115 is forced to protrude further than the perimeter chambers toward the occupant compartment.

Figure 5:
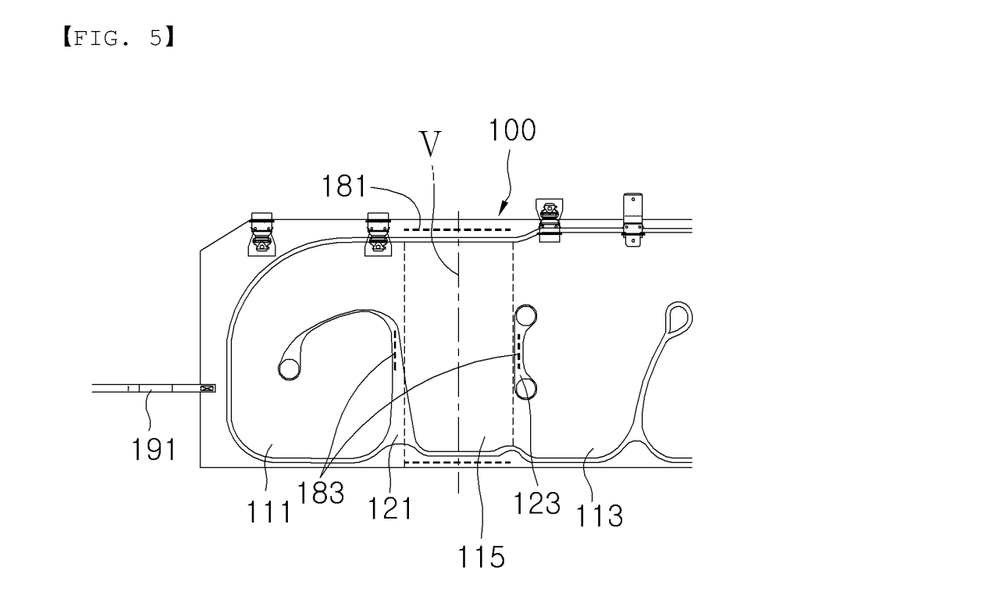
FIG. 5 is a partial side view showing a state in which a side curtain airbag for a vehicle according to another exemplary embodiment of the present invention is unfolded in a non-inflation state.

FIG. 5 is a partial side view showing a state in which a side curtain airbag according to an exemplary embodiment of the present invention is unfolded in a non-inflation state.

Referring to FIG. 5, middle portions of the front end side chamber wall 121 and the front chamber wall 123 are coupled to each other through a connection means 183.

FIG. 5 shows a state in which the stopper chamber 115 is fully unfolded, the front end side chamber wall 121 is spaced apart from the front chamber wall 123 by a predetermined distance.

However, the portion in which the front stopper chamber 115 is formed is substantially comprised of overlapped portion O as shown in FIGS. 3 and 4.

The front end side chamber wall 121 and the front chamber wall 123 are arranged to be adjacent to each other by folding the portion in which the stopper chamber 115 is located along the vertical central line V, and the front end side chamber wall 121 and the front chamber wall 123 are coupled with each other through the connection means 183. The connection means 183 may include a sewing line or a tether member. The sewing line may be formed in a predetermined length in the vertical direction of the front end side chamber wall 121 and the front chamber wall 124.

Like this, through the sewing line or the tether member, the outer side of the front stopper chamber 115 is restrained along the vertical direction of the airbag 110. Accordingly, the stopper chamber 115 is forced to be deployed toward the interior of the vehicle, thereby enhancing the effect for stopping the head of the occupant.

Figure 6:
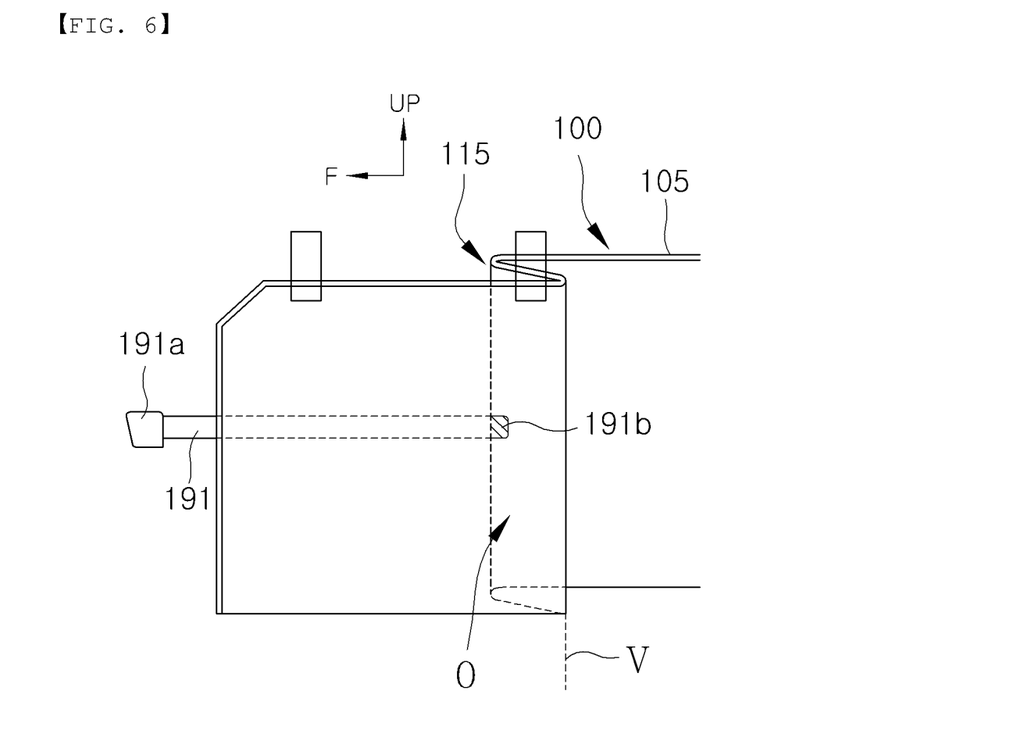
FIG. 6 is a view showing a partial portion of a side curtain airbag for a vehicle according to another exemplary embodiment of the present invention.

FIG. 6 is a view showing a partial portion of a side curtain airbag for a vehicle according to another exemplary embodiment of the present invention.

Referring to FIG. 6, the portion of the airbag, in which the stopper chamber 115 is located, includes the overlapped portion O formed by folding the portion in which the stopper chamber is located along the vertical central line V. The overlapped portion O protrudes toward the interior of the vehicle and is located on the inner panel 103 toward the rear side of the airbag 100.

Through this configuration, when the airbag is deployed, the stopper chamber 115 protrudes early toward rear side of the vehicle, thereby effectively preventing the head of the occupant from being ejected toward the front side of the vehicle.

One end 191a of the front strap 191 is coupled to the front vehicle body, and the other end 191b of the front strap 191 is coupled to the outer side of the overlapped portion O. By this configuration, a process for coupling the other end 191b of the strap 191 to the airbag 100 and a process for sewing the outer side of the overlapped portion O are performed at the same time, thereby reducing the number of manufacturing processes.

In the below descriptions, an operation principle of the above airbag will be described.

Figure 7:
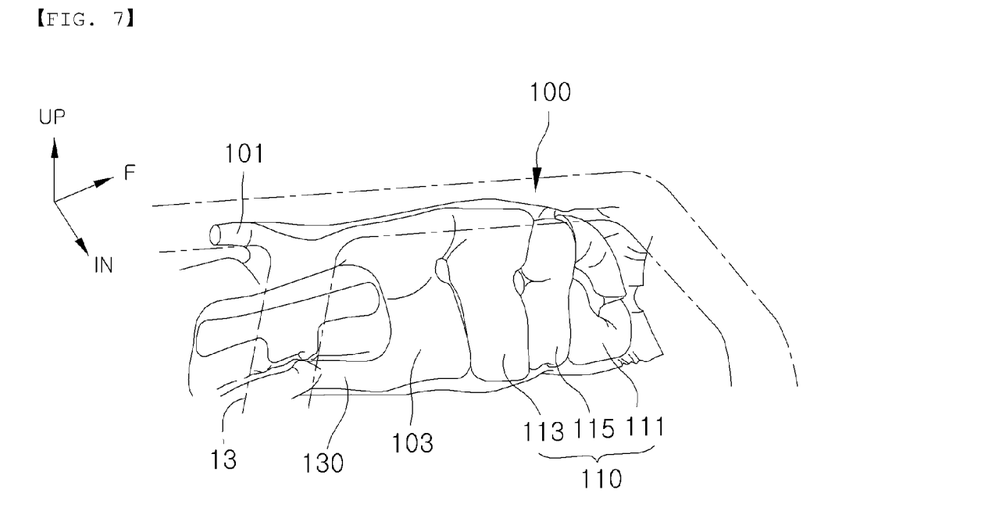
FIG. 7 is a view showing an inflation state of the side curtain airbag of FIG. 5 when viewed from the interior of the vehicle.
Figure 8:
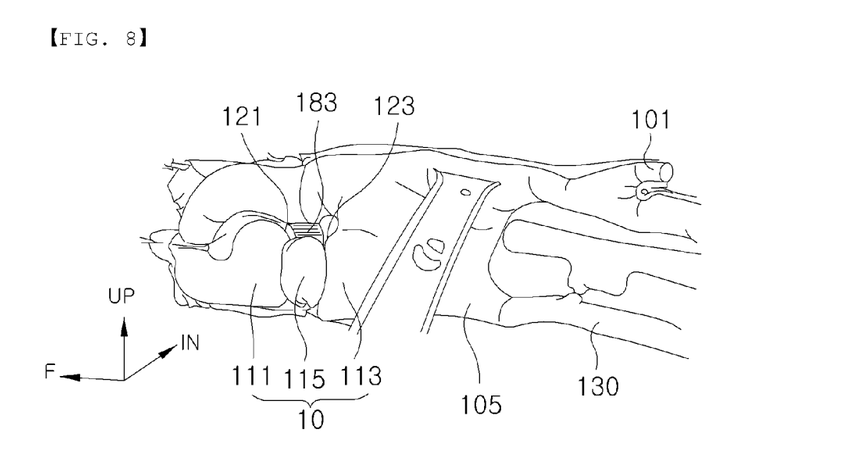
FIG. 8 is a view showing an inflation state of the side curtain airbag of FIG. 5 when viewed from the outer side of the vehicle.

FIG. 7 is a view showing an inflation state of the side curtain airbag of FIG. 5 when viewed from the interior of the vehicle, and FIG. 8 is a view showing an inflation state of the side curtain airbag of FIG. 5 when viewed from the outer side of the vehicle.

Referring to FIGS. 7 and 8, when the vehicle collision such as vehicle lateral impact is detected, the inflator 3 is operated, and the gas generated from the inflator 3 is introduced into the airbag 100 through the connection portion 101 formed at the upper central portion of the airbag 100.

The gas introduced into the airbag 100 through the connection portion 101 branches off and flows toward the front and rear sides of the airbag 100.

The gas introduced toward the front side of the airbag 100 through the connection portion 101 flows into the middle chamber 130, the front chamber 113, the front stopper chamber 115, and then into the front end side chamber 111 while flowing toward the front side of the airbag 100 in the transverse direction, so that the respective chambers are inflated.

The gas introduced toward the rear side of the airbag 100 through the connection portion 101 flows into the middle chamber 130, the rear chamber 153, and then into the rear end side chamber 151 while flowing toward the rear side of the airbag 100 in the transverse direction, so that the respective chambers are inflated.

At this time, since the stopper chamber 115 includes the overlapped portion O which protrudes toward the interior of the vehicle, when the airbag is deployed, the stopper chamber 115 is deployed to protrude relatively toward the interior of the vehicle, so that the head of the occupant is early prevented from being ejected toward the front side of the vehicle and sliding the along the instrument panel.

As described above, during inflation of the airbag 100, the outer side of the overlapped portion O is restrained by the connection means 183 such as the sewing line or tether member, and the front stopper chamber 115 is deployed to protrude relatively toward the interior of the vehicle, thereby enhancing the effect for stopping the head of the occupant.

In addition, since the overlapped portion O is located on the inner panel 103 toward the rear side of the airbag 100, the effect for stopping the head of the occupant is enhanced.

In the above descriptions, the stopper chamber is provided at the front seat side of the vehicle, but the stopper chamber may be provided at various locations. That is, the stopper chamber is provided at any locations for preventing the occupant from being moved toward the front of the vehicle.

Figure 9:
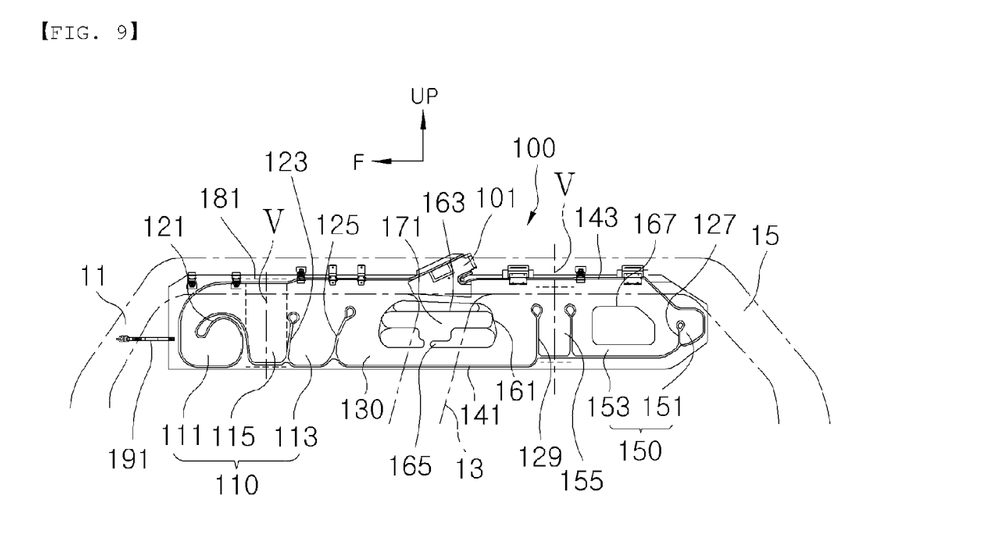
FIG. 9 is a side view showing a state in which a side curtain airbag for a vehicle according to another exemplary embodiment of the present invention is fully unfolded in a non-inflation state.

FIG. 9 is a side view showing a state in which a side curtain airbag for a vehicle according to another exemplary embodiment of the present invention is fully unfolded in a non-inflation state.

Referring to FIG. 9, the rear seat side chamber part 150 of the airbag 100 may further include a rear stopper chamber 155. The rear stopper chamber 155 includes the overlapped portion formed by folding the rear stopper chamber portion along the vertical central line V like the front stopper chamber 115.

The rear stopper chamber 155 protrudes toward the interior of the vehicle upon vehicle impact and prevents the head of the occupant seated on the rear seat of the vehicle from being moved toward the front side of the vehicle. As a result, the head of the occupant seated on the rear seat is prevented from colliding with a vehicle structure such as the front seat of the vehicle, thereby preventing the head of the occupant from being secondarily injured.

Figure 10A:
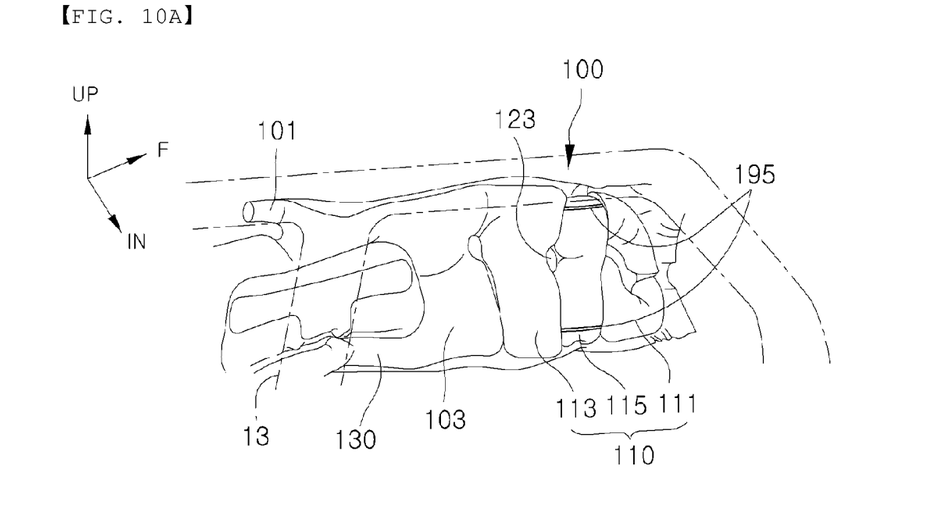
FIG. 10a is a view showing an inflation state of the side curtain airbag for a vehicle according to another exemplary embodiment of the present invention when viewed from the interior of the vehicle.
Figure 10B:
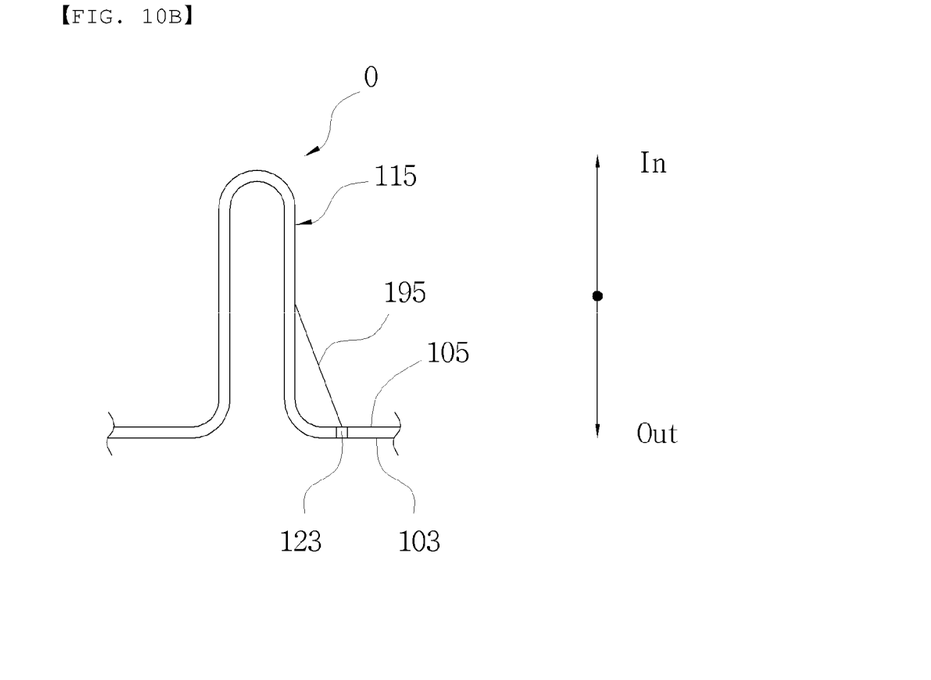
FIG. 10b is a cross-sectional view showing a stopper chamber of a curtain airbag for a vehicle according to another exemplary embodiment of the present invention.

FIG. 10a is a view showing an inflation state of the side curtain airbag for a vehicle according to another exemplary embodiment of the present invention when viewed from the interior of the vehicle, and FIG. 10b is a cross-sectional view showing a stopper chamber of a curtain airbag for a vehicle according to another exemplary embodiment of the present invention.

Referring to FIGS. 10a and 10b, a strength reinforcement member 195 is provided at the outer side of the stopper chamber such as the front stopper chamber 115, the outer side facing the interior of the vehicle so as to prevent a movement of the front stopper chamber 115, thereby reinforcing the force for stopping the head of the occupant.

The strength reinforcement member 195 may include a tether member, a strap, and the like. One end of the tether member is coupled to the outer side of the front stopper chamber 115, which faces the interior of the vehicle and the other end of the tether member is fixedly coupled to at a predetermined location such that the front stopper chamber 115 is pulled toward the rear side of the vehicle.

Through this configuration, when the airbag is inflated, the front stopper chamber 115 is pulled toward the rear side of the vehicle, thereby preventing the movement of the front stopper chamber 115 and reinforcing the force for stopping the head of the occupant.

FIGS. 10a and 10b show that the other end of the tether member is fixedly coupled to the front chamber wall 124, but the other end of the tether member may be coupled to any locations which can prevent the movement of the front stopper chamber 115.

Figure 11:
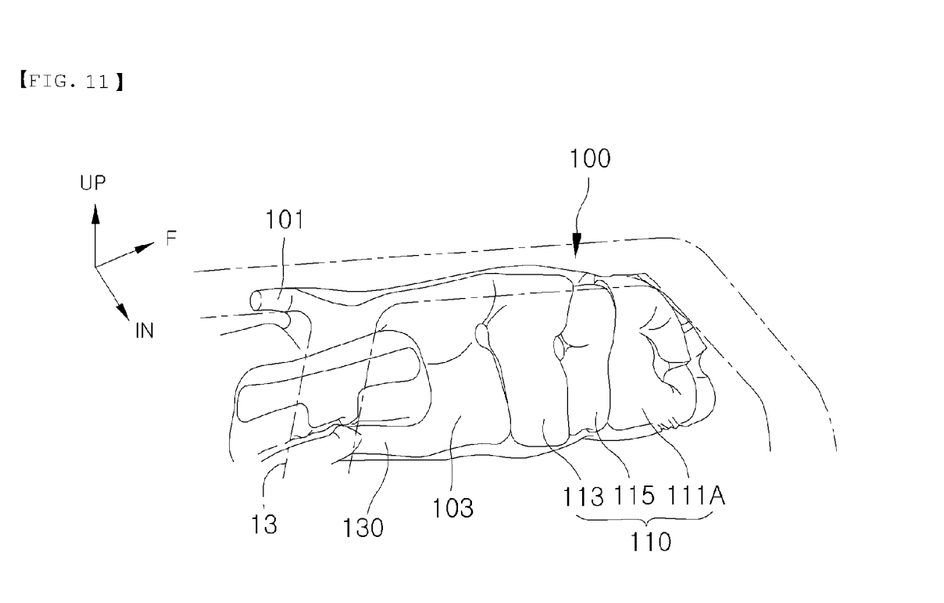
FIG. 11 is a view showing an inflation state of the side curtain airbag for a vehicle according to another exemplary embodiment of the present invention when viewed from the interior of the vehicle.

FIG. 11 is a view showing an inflation state of the side curtain airbag for a vehicle according to another exemplary embodiment of the present invention when viewed from the interior of the vehicle.

Referring to FIG. 11, an inflation volume of the front end side chamber 111A arranged at the front side of the front stopper chamber 115 is relatively increased such that the front stopper chamber 115 is prevented from being moved toward the front side of the vehicle.

That is, when the inflation volume of the front end side chamber 111A is relatively increased, the front stopper chamber 115 is restrained by the inflation force of the front end side chamber 111A and prevented from being moved toward the front side of the vehicle. As a result, the support strength of the front stopper chamber 115 is increased, thereby improving the force for stopping the head of the occupant.

In the above descriptions, when the airbag is deployed, the front stopper chamber 115 and the rear stopper chamber 155 protrude further than perimeter chambers toward the occupant compartment. However, the stopper chamber may be provided at any locations that approximately correspond to the head of the occupant so as to prevent the head of the occupant from being moved toward the front side of the vehicle.

Although the exemplary embodiments of the present invention have been described, it is understood that the exemplary embodiments help one ordinary skilled in the art to easily realize the present invention should not be limited to these exemplary embodiments and accompanying drawings. Therefore, various changes and modifications can be apparently made by the skilled in the art without departing from the technical sprit of the present invention. In addition, it is understood that parts that can be easily changed by the skilled in the art are within the spirit and scope of the present invention as hereinafter claimed.

The invention claimed is:

1. A side curtain airbag for a vehicle, the side curtain airbag comprising:
   an inner panel for facing an interior of the vehicle;
   an outer panel facing the inner panel;
   a plurality of inflatable chambers including:
      a stopper chamber configured to prevent a head of an occupant seated in the vehicle from being moved toward a front side of the vehicle;
      a first chamber arranged at a front side of the stopper chamber; and
      a second chamber arranged at a rear side of the stopper chamber,
   wherein the first chamber and the second chamber are arranged adjacent to each in a non-inflation state of the airbag, and wherein the inner and outer panels of the airbag are both folded at least one time along a vertically extending line where the stopper chamber is located to form an overlapped portion.

2. The airbag according to claim 1, wherein the stopper chamber is provided in at least one of a front seat space and a rear seat space of the vehicle.

3. The airbag according to claim 1, wherein:
   the first chamber is a front end side chamber defined by a front end side chamber wall to correspond to the front side of the vehicle; and
   the second chamber is a front chamber defined by a front chamber wall to be adjacent to the front end side chamber;
   wherein the stopper chamber is interposed between the front end side chamber and the front chamber to prevent the head of the occupant from being moved toward the front side of the vehicle.

4. The airbag according to claim 3, wherein the front end side chamber wall is arranged to be adjacent to the front chamber wall such that in the non-inflation state of the airbag, the stopper chamber protrudes toward the interior of the vehicle; and
   upper ends and lower ends of the overlapped portion of the front stopper chamber are sewed to each other respectively through a sewing line.

5. The airbag according to claim 4, wherein the front end side chamber wall and the front chamber wall are coupled to each other by a sewing line or a tether member.

6. The airbag according to claim 4, further comprising:
   a front strap having one end coupled to a front vehicle body of the vehicle and the other end coupled to the front end side chamber wall and the front chamber wall adjacent to the front end side chamber wall.

7. The airbag according to claim 1, further comprising:
   a strength reinforcement member coupled to an outside of the stopper chamber to reinforce a force for supporting the stopper chamber.

8. The airbag according to claim 7, wherein the strength reinforcement member includes a tether member having one end coupled to the outside of the stopper chamber, the outside facing the interior of the vehicle, and the other end fixedly coupled to at a predetermined location.

9. The airbag according to claim 1, wherein the airbag is configured to prevent the stopper chamber from being moved toward the front side of the vehicle by increasing an inflation volume of the first chamber arranged at the front side of the stopper chamber.

10. The airbag according to claim 1, wherein the inflatable chambers of the plurality of inflatable chambers are fluidly separated from one another in a direction perpendicular to the vertically extending line at a lower end of the airbag.

11. The airbag according to claim 1, wherein the overlapped portion of the airbag is inflatable.

12. A side curtain airbag for a vehicle, the side curtain airbag comprising:
- an inner panel having a longitudinally extending length greater than a height;
- an outer panel facing the inner panel; and
- a plurality of inflatable chambers defined between the inner and outer panels, the plurality of inflatable chambers including a first chamber, a second chamber, and a stopper chamber longitudinally positioned between the first and second chambers,
- wherein the stopper chamber is folded along a vertically extending line such that both of the inner and outer panels are both folded along the vertically extending line so as to position the first and second chambers adjacent to one another in a non-inflation state of the airbag.

13. The side curtain airbag according to claim 12, wherein the inflatable chambers of the plurality of inflatable chambers are fluidly separated from one another in a direction perpendicular to the vertically extending line at a lower end of the airbag.

14. The side curtain airbag according to claim 12, wherein the overlapped portion of the airbag is inflatable.

15. The side curtain airbag according to claim 12, wherein the inner panel is generally oriented in a first plane and the outer panel is generally oriented in a second plane, the first and second planes being generally parallel to one another.

16. The side curtain airbag according to claim 15, wherein the overlapped portion inwardly extends in a direction perpendicular to the first and second planes.

* * * * *